United States Patent [19]

Zall et al.

[11] 4,344,970

[45] Aug. 17, 1982

[54] STABILIZATION OF MILK AND IMPROVED CHEESE YIELDS

[75] Inventors: Robert R. Zall; David J. Dzurec, both of Ithaca, N.Y.

[73] Assignee: Cornell Research Foundation, Inc., Ithaca, N.Y.

[21] Appl. No.: 207,861

[22] Filed: Nov. 18, 1980

[51] Int. Cl.$^3$ .......................... A23C 3/02; A23C 19/05
[52] U.S. Cl. ........................................ 426/40; 426/36; 426/522
[58] Field of Search ............................ 426/40, 36, 522

[56] References Cited

U.S. PATENT DOCUMENTS

| | | | |
|---|---|---|---|
| 2,309,872 | 12/1945 | Dahlberg et al. | 426/522 |
| 2,712,504 | 7/1955 | Coulter | 426/522 X |
| 3,017,274 | 1/1962 | Dahlstrom | 426/40 X |
| 3,039,879 | 6/1962 | Vakaleris | 426/40 |

FOREIGN PATENT DOCUMENTS

| | | | |
|---|---|---|---|
| 508499 | 6/1939 | United Kingdom | 426/522 |
| 529834 | 11/1940 | United Kingdom | 426/522 |

OTHER PUBLICATIONS

Webb et al., Byproducts from Milk, 2nd Ed., 1970, Avi, Westport, Conn., pp. 184–187.
T. I. Hedrick and Erland Kondrup, "Good Quality High Yield Cottage Cheese," American Milk Review, 44, 80, 82–84.

*Primary Examiner*—Joseph M. Golian
*Attorney, Agent, or Firm*—Jones, Tullar & Cooper

[57] ABSTRACT

The flavor stability of milk is enhanced by heating fresh milk at a temperature and for a time sufficient to significantly lower its bacterial count. Further the yields in a convention cottage cheese or quarg making process are enhanced when milk is similarly heat treated and then aged prior to use in the cheese making process.

3 Claims, No Drawings

STABILIZATION OF MILK AND IMPROVED CHEESE YIELDS

BACKGROUND OF THE INVENTION

U.S. Pat. No. 3,039,879 describes a process for making cottage cheese which includes the treatment of milk under special conditions of temperature and time to effect a conditioning of the protein in the milk. The resultant product does not have as smooth a texture as the product of the invention.

DESCRIPTION OF THE INVENTION

Changes in on-farm milk harvesting methods as well as storing milk longer in refrigerated bulk tanks are thought to contribute to the problem of psychrotrophic organisms in milk. Heat treating milk prior to storage appears to control psychrotrophs and reduces ADV values.

This invention relates on the one hand to a process for improving the storage stability of milk. On the other hand, this invention relates to a process for making cottage cheese, quarg or similar cheese products whereby substantially improved yield is obtained.

In either of the above two processes fresh milk, preferably within a few hours after leaving the cow, and generally within thirty minutes after leaving the cow, is heated to a temperature of at least about 150° F., and preferably 165° F. for about 10 seconds or 260° F. for 2 seconds, or at an equivalent intermediate temperature and time, to provide a milk which can still be considered at least partially raw by phosphatase analysis, but which does not contain a bacterial count of in excess of 100,000 until after seven days normal refrigerated storage.

In the cheese making process of the invention, in addition to a heat treating step, the heat treated cheese is aged prior to being employed to make cottage cheese or quarg. Generally the milk is aged under refrigerated conditions for at least about two days and preferably six to ten days or longer, up to a time when noticable changes in flavor begin to occur, before it is employed in a cheese making process. The precise effect of the aging step is not known, but the aging enhances cheese yields.

While aging the heat treated milk for at least about two days, and preferably six to ten days, appears essential to enhancing the yields in the cheese making process, conventionally the milk heat treated soon after it leaves the cow, as described above, is passed into a refrigerated holding tank, on a regular daily or bi-daily basis. Thus, typically, milk withdrawn from the tank would represent a blend of milk aged between the age of the first addition and last addition to the tank. Such milk blends where the oldest milk has been aged for at least three to five days and preferably six to ten days can be satisfactorily employed in the cheese making process of the invention to enhance cheese yields.

With respect to the cheese making process, it appears that heat treatment apparently in conjunction with the post treatment aging step provides a milk which apparently has at least a significant portion of the milk protein partially denatured, (as opposed to complete denaturization of a significant portion of the milk protein as taught in U.S. Pat. No. 3,039,879). In the cheese making process it is theorized that this partially denatured protein is absorbed into the particles being formed increasing the amount of protein in the cheese product in a manner which provides a product which is smooth to the palate, with no discernible graininess.

The cheese making process of this invention can be any conventional process for making cottage cheese or quarg. The presently employed process is that described by Emmons and Tuckey "Cottage Cheese and Other Culture Products" Pfizer Cheese Monograph, Vol. 3 (1967).

EXAMPLE 1

Milk was collected over many trials from several farms and promptly heated to different temperatures ranging from 120° F. to 165° F. for different time periods. Milk so treated was stored at 7° C. (45° F.) and monitoried over time for the following quality parameters: standard plate count (SPC), psychrotrophic count, acid degree value (ADV), and organoleptic evaluation.

The goal set forth was to learn whether or not heat treating of milk would protect milk's delicate qualities longer than unheated milk.

Data from the bench top studies showed that heated milk would last longer and keep better.

The next step was to scale up the size of this study. We segregated the heat treated milk from the farms regular tank by collecting it in a separate 250 gallon bulk tank which was installed specifically to store heat treated milk. Some milk was heat treated on the farm as produced and was added daily to our small bulk tank over seven days. On day eight milk was then transported to the milk processing plant where it was pasteurized and packed in containers similar to the regular milk which is sold to on-campus dining and through a public sales outlet (a dairy store). The data generated from the study was similar to bench top information. One goal in the project was to continue the heat treating of milk long enough to see if seasonal variation interferes with the information collected.

There appears to be an added interest in the work which is energy-related. It seems reasonable to think that the dairy industry may be able to pick heat treated bulk milk up less frequently.

Review of Farm Data

A series of heat treating experiments with on-farm milk were carried out over several months. There were some variations in acid degree values among individual experiments, but the average values pretty much showed similar patterns.

These results are similar to those obtained in earlier experiments where milk was heated in our pilot plant at different temperatures for different times. At that time, eight to ten gallons of raw milk were collected in a milking parlor from a sampling point located in a milking system pipeline just before the milk flowed into an in-line cooling tube. Within 30 minutes from the time the sample was taken, this milk was heat treated and cooled using an APV Junior heat exchanging system (APV Company, Inc., Buffalo, N. Y. 14207).

Heat treated samples and unheated control samples were immediately chilled and stored under refrigeration at 7° C., or about 45° F., and analyzed for select parameters over several days. Besides SPC, pyschrotrophs, ADV and organoleptic tests, the milk samples were always checked for inhibitory substances using the Delvotest method (pages 338-346 in "Standard Methods for the Examination of Dairy Products," 1978, pub. American Public Health Association).

Initially, duplicate psychrotroph counts were carried out simultaneously using a modified bacteriological method [Parmelee, *Dairy and Ice Cream Field*, 157 (8):38] and with the standard method of enumerating such counts. The statistical correlation of accuracy between the two methods was 0.9983 which compares with the value of 0.99 reported by Oliveria and Parmelee, *J. Milk Food Technology*, 39 (4):269–272. The reason for running both tests for determining psychrotrophic bacteria was to show that a faster test than the standard method to determine psychrotrophs was valid for our system. In subsequent work, we discontinued the standard methods test for psychrotrophs and used the Oliveria and Parmelee method, a 25 hour test versus a ten-day incubation period. (Parmelee test, 25 hrs. at 21° C. using standard plate count agar. Standard Methods is 10 days at 7° C. using standard plate count agar.)

As other workers have already shown, unheated raw milk increases from about 10,000 to more than 370,000 organisms/ml within 3 days at 7° C. When milk is heated to 150° F. (66° C.) for 10 seconds, the bacterial counts do not exceed 100,000 count until it's stored for seven days. Milk heat treated this way is still partially raw by phosphatase analysis. The 165° F. (74° C.) heated milk retains a low bacterial count beyond 8 days.

Each day about 40 gallons of fresh heated milk were added to the tank as a farmer might do if he or she heated milk in a heating system as it flowed from cows to storage before cooling.

These data are similar to our previous results where we heated milk in laboratory-like situations.

Pasteurizing 8-Day Old Milk

Segregated farm heated milk was transported to a plant in the regular over-the-road tank truck and treated similar to the regular milk supply.

The plant processes milk which it sells to dormitory food centers and to an on-site dairy store. Milk is processed at 165° F. (74° C.) for 15 seconds and then pumped through an aerovac (ARO-VACS high temperature heater-Cherry Burrell Corp, Cedar Rapids, Iowa) where it is heated under vacuum at 202° F. (94° C.) for less than a second.

The regular and experimental milk was stored in the plant's coldroom at about 6° C. (43° F.) for different time periods and regularly examined for quality parameters using biological, chemical and organoleptic methods (Table 1 shows select data).

TABLE 1

Comparing bacterial counts and acid degree values of stored farm heated milk[1] with its control when transported to a milk plant and pasteurized.

| Items | Weeks[2] | Control | Experimental |
|---|---|---|---|
| SPC | 0 | 93 | 68 |
|  | 1 | 178 | 120 |
|  | 2 | 870 | 235 |
| Psychrotrophs | 0 | 2 | 2 |
|  | 1 | 26 | 7 |
|  | 2 | 355 | 129 |
| ADV | 0 | 0.89 | 0.67 |
|  | 1 | 1.17 | 0.76 |
|  | 2 | 1.37 | 1.08 |

[1]Experimental milk was heated on the farm at 165°/10 sec.
[2]After pasteurization in a milk plant both milks were stored at 4° C. in the walk-in cooler.

Trained dairy students and faculty personnel checked the milk organoleptically as did a random group of consumers. People were given milk samples to taste prior to their going for lunch in cafeterias and asked the following questions:
 (a) Do you drink milk?
 (b) How often do you drink milk?
 (c) Can you detect differences in the milk you sampled?
 (d) Which milk do you prefer?

The results of these trials showed that farm heated milk can be stored up to four times longer than regular bulk milk and still grade as well as a more conventional milk supply. In addition, different trials were made with experimental 8-day old farm heated milk where it was pasteurized in the dairy plant without running it through the aerovac. This milk was compared with the regular milk supply which was also processed without using the aerovac and stored like regular processed milk.

About 500 people tasted these milks over several days and again there were no significant differences in 2-day old milk versus 10-day old milk. Table 2 summarizes these data.

TABLE 2

Taste Test[1] By Milk Drinkers Of Aged Farm Heated Stored Milk Versus A Regular Supply

|  | % Preference | | |
|---|---|---|---|
|  | Experimental | Control | No Preference |
| A | 27.6 | 26.7 | 45.7 |
| B | 25.6 | 36.6 | 37.8 |
| $\overline{X}$ | 26.6 | 31.7 | 41.8 |

[1]Test was conducted at two locations (A & B) over a period of 3 weeks where approximately 500 consumers were involved.

Using Aged Milk in Cultured Products

Most defects in cultured products probably relate to poor milk, undesirable starter, and/or a breakdown in sanitation. Into the web of failure we could also include inadequate workmanship and a weak or poorly thought out quality assurance program. For example, we believe that a defect or breakdown of milk fat to cause rancidity is associated with a growth of bacteria as well as through enzymatic degradation.

Our data conflict with the work of others who believe that bacterial numbers in milk have to exceed $10^6$ organisms/ml before people can taste flavor defects.

Some researchers speculate that high count milk with proteolytic psychrotrophic bacteria break down cheese-making protein casein enough to cause vat failures. If cheese is made from such milk, then the casein particles are so damaged as to make cheesemaking difficult and produces poor quality finished goods. They suspect that the casein micella is altered so a firm curd will not be formed. The yield of cottage cheese is influenced by psychrotrophic microorganisms. Researchers published work that showed that when cheese was made with milk contaminated with psychrotrophs, it lost about 0.5% in yield even without vat failures. Yield decreased from 14.88% based on 20% solids to 14.48%. When psychrotrophic organisms were isolated from milk obtained from a cheese plant having operational problems and these were inoculated into cottage cheese milk used at the same research station, then their yield dropped to 14.38%.

Cheesemakers have always complained about cheese quality when it was manufactured from milk stored too long prior to pasteurization. Bacteriological problems in today's milk are different than those they had to live with a few years ago. Milk generally doesn't sour due to lactic acid bacteria, but now the supply will be degraded or spoiled by cold storage microorganisms growing at 5° C. which work on fat and protein to break down these constituents with more subtle defects. Stored farm heated milk reacts favorably to different culturing situations. Culture activity between fresh milk and 8-day old milk are not dissimilar. The yogurt culture was run along with cultured milk starter because yogurt processing tends to be more sensitive to inhibitory material in milk then cultures for cheesemaking, at least in the early stage of the make process.

Some phases of processing in cheesemaking can be improved by heat treating milk on farms. Cultured products like buttermilk and yogurt can be made about as well with aged heated farm milk as with fresh milk.

EXAMPLE 2

Milk, as it flowed from cows, was intercepted as it left the milking parlor and was heated to 165° F. for ten seconds. (This was not pasteurization and, in fact, the milk is still slightly raw as tested by regulatory agencies by the phosphatase test). The milk was then cooled to about 40° F. and stored in a refrigerated farm bulk tank. Additional milk which was similarly treated was added to the tank daily over several days. On day seven the milk was picked up by an over-the-road tanker and brought to a dairy plant where it was processed (pasteurized or converted into milk products).

Eight day old farm heated stored milk, as above, was converted into cottage cheese and quarg using an otherwise conventional process. The data indicate that the yields of cottage cheese and quarg increase between 5% and 10% by the preheat treatment, as compared to unheated skim milk.

TABLE 3

| Cottage Cheese Yields Adjusted to 80% H$_2$O | |
| --- | --- |
| Skim milk treatment | Yield (Kg)/20 Kg skim milk |
| Experiment 1 | |
| unheated raw #1 | 2.89 |
| stored-raw* | 2.95 |
| heated #1** | 3.10 |
| heated #2** | 3.23 |
| Experiment 2 | |
| unheated raw | 2.86 |
| stored-raw | 3.20 |
| heated #1 | 3.03 |
| heated #2 | 3.18 |
| Experiment 3 | |
| unheated raw #1 | 3.18 |
| stored-raw | 3.06 |
| heated #1 | 3.15 |
| heated #2 | 3.18 |
| Experiment 4 | |
| unheated | 2.92 |
| stored-raw | 3.15 |

TABLE 3-continued

| Cottage Cheese Yields Adjusted to 80% H$_2$O | |
| --- | --- |
| Skim milk treatment | Yield (Kg)/20 Kg skim milk |
| heated #1 | 3.26 |
| heated #2 | 3.32 |
| Experiment 5 | |
| unheated | 3.09 |
| stored-raw | 3.23 |
| heated #1 | 3.22 |
| heated #2 | 3.26 |

*stored-raw = 5 days refrigerated storage
**different batches both treated at 165° F. for 10 seconds

TABLE 4

| Quarg Yields Adjusted to % Water | |
| --- | --- |
| Skim milk treatment | Yield (Kg)/19 Kg skim milk |
| Experiment 1 | |
| unheated #1 | 3.32 |
| stored-raw | 3.54 |
| heated #1 | 3.40 |
| heated #2 | 3.63 |
| Experiment 2 | |
| unheated | 3.18 |
| stored raw | 3.12 |
| heated | 3.09 |
| Experiment 3 | |
| unheated | 3.01 |
| stored raw | 2.86 |
| heated #1 | 2.95 |
| heated #2 | 3.12 |
| Experiment 4 | |
| unheated | 2.75 |
| stored raw | 2.92 |
| heated #1 | 3.10 |
| heated #2 | 3.20 |

While yield variations varying from batch due to the fact that cheese making involves active biological systems, the above data, plus other accumulated data demonstrate that, on average, the heat treatment-aging process of the invention results in a 5–10% increase in cheese yield.

What is claimed is:

1. A process for increasing the yield of cottage cheese or quarg which comprises:
   heating fresh milk within a few hours after leaving the cow, under non-pasteurizing conditions of at least about 150° C., to result in a product which is still raw by the phosphatase analysis and which has a reduced level of flavor-affecting bacteria;
   aging the heated milk under refrigerated condition for a period between at least two days and the time that noticeable change in flavor occurs;
   pasteurizing the milk and processing the pasteurized milk into cottage cheese or quarg.

2. The method as in claim 1 where the milk is heated at conditions of at least about 165° F.

3. The method as in claim 1 where the milk has been aged about 6 to about 10 days.

* * * * *